(12) United States Patent
Veligdan (10) Patent No.: US 7,222,969 B2
(45) Date of Patent: *May 29, 2007

(54) SPLIT IMAGE OPTICAL DISPLAY (75) Inventor: James T. Veligdan, Manorville, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/139,243

(22) Filed: May 27, 2005

(65) Prior Publication Data
US 2005/0206853 A1  Sep. 22, 2005

Related U.S. Application Data

(62) Division of application No. 10/464,984, filed on Jun. 19, 2003, now Pat. No. 6,899,433.

(51) Int. Cl.
G03B 21/56 (2006.01)
G03B 21/28 (2006.01)

(52) U.S. Cl. .............................. 353/37; 353/77; 353/98; 359/460

(58) Field of Classification Search ................. 353/69, 353/70, 74, 77–79, 98, 99, 119, 122, 94, 34, 353/37, 50, 51, 28, 30; 359/207, 208, 460, 359/879, 880; 385/116, 119, 121; 348/750, 348/756, 757, 778–786; G03B 21/56, 21/28
See application file for complete search history.

(56) References Cited

U.S. PATENT DOCUMENTS

| 4,729,631 | A | 3/1988 | Takahashi et al. | 359/456 |
|---|---|---|---|---|
| 5,223,869 | A | 6/1993 | Yanagi | 353/78 |
| 5,274,406 | A | 12/1993 | Tejima et al. | 353/70 |
| 5,381,502 | A | 1/1995 | Veligdan | 385/115 |
| 5,422,691 | A | 6/1995 | Ninomiya et al. | 353/69 |
| 5,455,882 | A * | 10/1995 | Veligdan | 385/116 |
| 5,668,907 | A | 9/1997 | Veligdan | 385/120 |
| 5,716,118 | A | 2/1998 | Sato et al. | 353/98 |
| 5,902,030 | A | 5/1999 | Blanchard | 353/30 |
| 6,002,826 | A | 12/1999 | Veligdan | 385/120 |
| 6,012,816 | A | 1/2000 | Beiser | 353/122 |
| 6,031,954 | A | 2/2000 | Higuchi | 385/120 |
| 6,059,413 | A | 5/2000 | Okubo | 353/77 |
| 6,301,417 | B1 | 10/2001 | Biscardi et al. | 385/120 |
| 6,317,545 | B1 * | 11/2001 | Veligdan | 385/120 |
| 6,328,448 | B1 | 12/2001 | Beiser | 353/70 |

(Continued)

FOREIGN PATENT DOCUMENTS

JP 2001-330891 A * 11/2001

OTHER PUBLICATIONS

Derwent Abstract, 2005, Derwent, Basic information and abstract of JP 2001-330891A.*

Primary Examiner—W. B. Perkey
Assistant Examiner—Andrew Sever
(74) Attorney, Agent, or Firm—Matthew J. Esserman (57) ABSTRACT

A video image is displayed from an optical panel by splitting the image into a plurality of image components, and then projecting the image components through corresponding portions of the panel to collectively form the image. Depth of the display is correspondingly reduced.

28 Claims, 6 Drawing Sheets

U.S. PATENT DOCUMENTS

| | | | |
|---|---|---|---|
| 6,388,810 B1 | 5/2002 | Monson et al. | 359/443 |
| 6,389,206 B1* | 5/2002 | Veligdan | 385/120 |
| 6,406,150 B1* | 6/2002 | Burstyn | 353/69 |
| 6,457,834 B1 | 10/2002 | Cotton et al. | 353/122 |
| 6,481,856 B1 | 11/2002 | Weissman et al. | 353/98 |
| 6,485,145 B1 | 11/2002 | Cotton et al. | 353/69 |
| 6,511,186 B1* | 1/2003 | Burstyn et al. | 353/76 |
| 6,513,935 B2 | 2/2003 | Ogawa | 353/37 |
| 6,535,674 B2 | 3/2003 | Cotton et al. | 385/120 |
| 6,561,651 B1 | 5/2003 | Kubota et al. | 353/30 |
| 6,733,138 B2 | 5/2004 | Raskar | 353/94 |
| 6,899,433 B2* | 5/2005 | Veligdan | 353/37 |
| 2004/0032539 A1* | 2/2004 | You | 348/744 |

\* cited by examiner

SPLIT IMAGE OPTICAL DISPLAY

This application is a divisional of U.S. patent application Ser. No. 10/464,984, filed Jun. 19, 2003, issuing on May 31, 2005 as U.S. Pat. No. 6,899,433.

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

The present invention relates generally to optical panels, and more specifically to thin optical display panels comprising optical waveguides.

Optical display screens are found in many common applications such as televisions, computer displays, and displays for industrial and scientific equipment. Common display screens form images using a cathode ray tube (CRT) which is relatively long and requires a large enclosure.

Rear projection television (RPTV) displays utilize image light which is projected to the back side of a screen for displaying the image on its front side. The resulting enclosures for these RPTV displays have a considerable depth for accommodating the necessary optical components for focusing, enlarging, and directing the image light.

Thin display screens of various forms are continually being developed for replacing CRTs to minimize the screen enclosure and overall weight. A common thin panel uses a liquid crystal display (LCD) for modulating light therethrough for creating video images.

Another type of thin display panel includes thin optical waveguides laminated together in a thin wedge shape through which image light is internally reflected between a narrow inlet face and a large outlet screen. U.S. Pat. No. 5,381,502 is one of a series of patents based on this technology being developed for improving performance of thin display panels.

Yet another type of thin optical display being developed includes a prismatic optical film for turning incident light up to about 90°. The film requires a light incidence angle between 0° and 20°, and a corresponding depth between the film and the image light source in which to spread the light across the entire surface of the film. As the size of the display increases, the required depth behind the display increases, thusly increasing the overall thickness or depth of the enclosure.

Accordingly, it is desired to further reduce the overall thickness or depth of the enclosures for optical displays.

BRIEF SUMMARY OF THE INVENTION

A video image is displayed from an optical panel by splitting the image into a plurality of image components, and then projecting the image components through corresponding portions of the panel to thereby collectively form the image. Depth of the overall display is correspondingly reduced.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
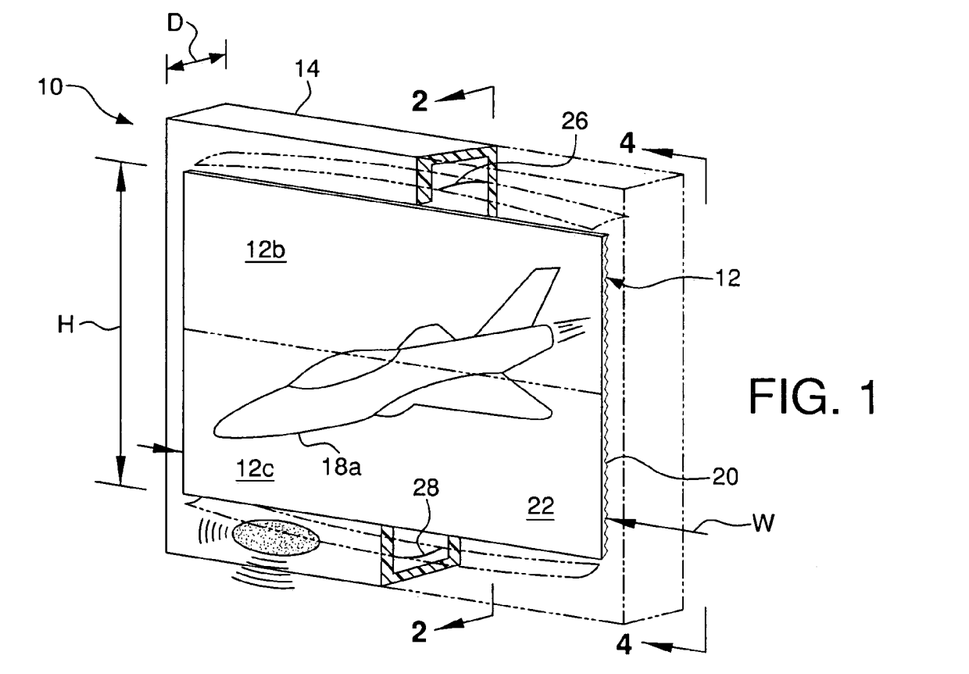
FIG. 1 is a partly sectional front view of a video display in accordance with an exemplary embodiment of the present invention.

Illustrated in FIG. 1 is a video image display 10 in accordance with an exemplary embodiment of the present invention. The display is an assembly of components including a prismatic optical panel 12 sized in horizontal width W and vertical height H for any desired application. An exemplary large panel video display screen is illustrated, and may have a diagonal screen measurement of about a 1.3 meter (50 inches) for example. The optical panel may be suitably mounted in a cabinet or enclosure 14, shown in part, for mounting therein all working components thereof if desired within a narrow cabinet depth D.

Figure 2:
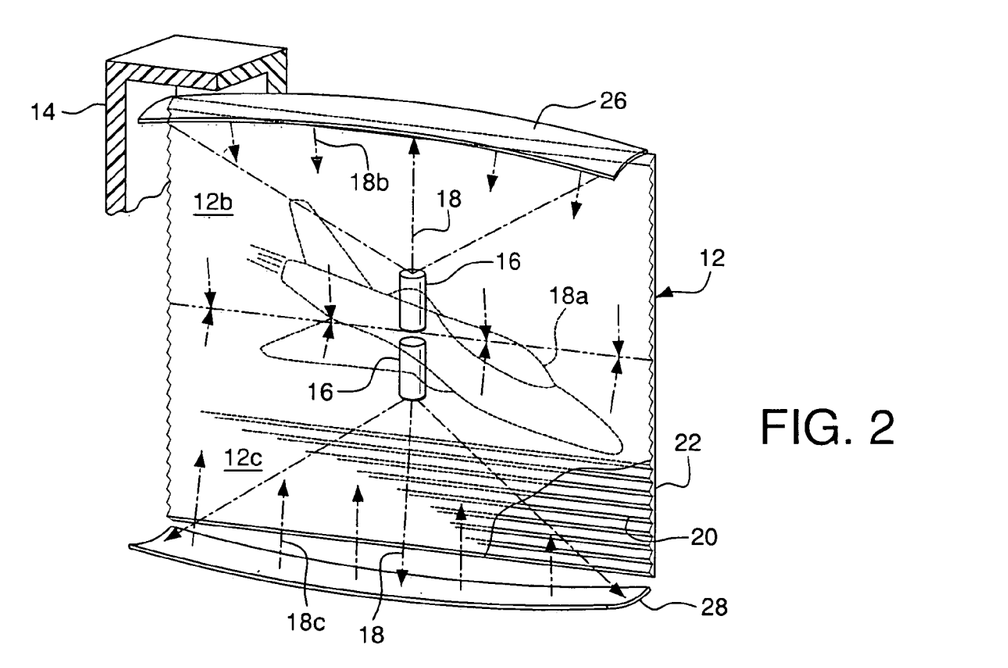
FIG. 2 is a back side view of the display illustrated in FIG. 1 shown partly in section and taken along line 2—2 in FIG. 1.

In the exemplary embodiment illustrated in FIG. 2 which is a back side view of the display in FIG. 1, the optical panel 12 cooperates with a pair of projectors 16 suitably configured for projecting image light 18 in the form of a beam through the panel for producing a video image 18a for direct viewing by an observer facing the front of the panel. The projectors 16 each may take any conventional form capable of projecting a viewable image.

Figures 3, 4:
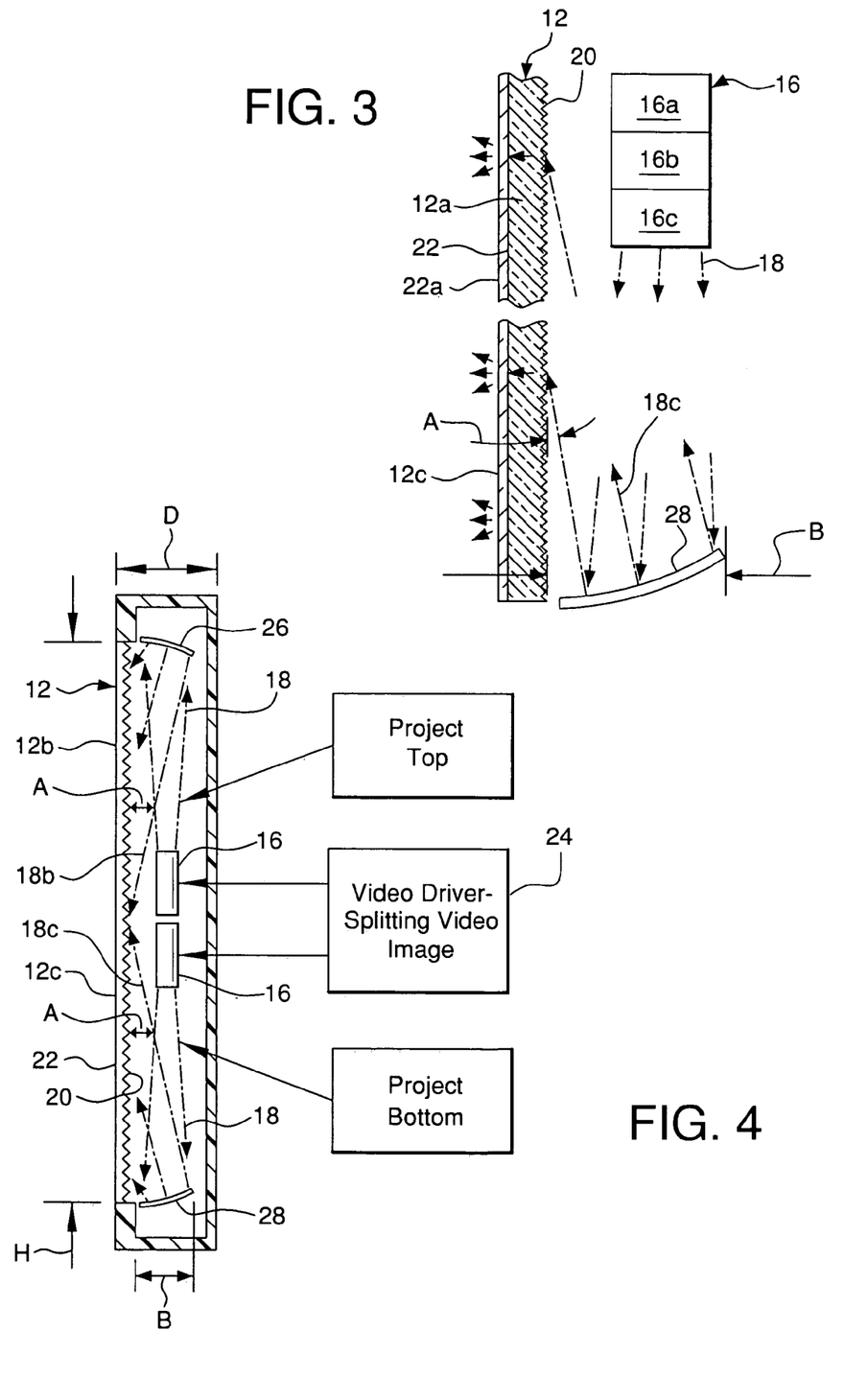
FIG. 3 is an enlarged sectional side view through the bottom portion of the display illustrated in FIG. 1 having an optical panel in accordance with a preferred embodiment.
FIG. 4 is a sectional, side view of the display illustrated in FIG. 1 and taken along line 4—4 in FIG. 1.

For example, the image beam 18 is initially generated as plain, unmodulated light in a suitable light source 16a as shown in FIG. 3, which may be a bright incandescent bulb, or laser, or any other suitable light source. The initial light may be monochromatic, or have color as desired.

The plain light is then spatially modulated in a modulator 16b for creating individual picture elements, or pixels, which define the desired video image or pattern. The modulator may take any conventional form such as a liquid crystal display (LCD) or a Digital Micromirror Device (DMD).

The LCD is a light transmissive device having portions which are selectively rendered opaque for selectively interrupting the light at selected pixels. The DMD is a light reflective device and has individual micromirrors which are selectively tiltable to reflect the light toward the panel or away therefrom for defining corresponding pixels.

Suitable imaging optics 16c, including lenses, are optically aligned between the panel and the light modulator for horizontally and vertically scaling and focusing the image beam as required over the back side of the panel for transmission therethrough. Although the light source 16a, modulator 16b, and imaging optics 16c are illustrated schematically as being connected as one integral unit, the location of each of these components may differ as desired. For example, each component may be separate from one another by some distance.

In the preferred embodiment illustrated in FIG. 3, the panel 12 is in the form of an optically transparent body or film 12a which may have any suitable material composition such as glass or plastic, with an exemplary index of refraction of about 1.56 for plastic.

The panel 12 in sheet form has a prismatic first side 20 that defines an inlet face optically aligned with the projector 16 for receiving the image beam 18 therefrom at an acute angle of incidence A. The panel 12 is transparent for internally reflecting the image beam 18 at the inlet face 20 for display from an opposite second side which defines an outlet screen 22.

The inlet face 20 includes a multitude of optically transparent serrations or prisms for receiving the image beam 18 from the projector 16. The prisms are integrally formed with the film 12a in a unitary optically transmissive member for transmitting the image beam 18 through the film by total internal reflection therein for display at the screen 22.

The screen 22 may not have another element thereon, or it may include a light diffuser 22a for diffusing or spreading the image beam 18 for increasing the field of view. The diffuser may be a surface layer 22a of the film 12a which is suitably frosted for diffusing the image beam 18 in producing the image viewable by the observer. Or, the diffuser 22a may be a separate light diffusing member or sheet laminated against the smooth side of the film 12a for diffusing the image light. Examples of such diffusers include holographic diffusers commercially available from Physical Optics Corp., Torrance, Calif., and lenticular screens commercially available from Dai Nippon Corp. (DNP), Copenhagen, Denmark, through U.S. distributors.

In the exemplary embodiment illustrated in FIG. 3, the panel first and second sides 20,22 are directly opposite to each other for minimizing the overall thickness of the panel. Each of the prisms is in the preferred form of a triangle having transparent first and second facets intersecting at a corresponding apex having an acute included apex angle therebetween. The optical panel has a thickness measured from the apexes of the prisms and the opposite second side screen 22 or, if included, a diffuser 22a.

The length of the prisms are parallel to each other, and first and second facets of adjoining prisms define V-grooves therebetween so that the entire panel first side is uniformly serrated.

The prisms preferably extend in length horizontally across the full width of the panel as shown in FIG. 2, and are spaced apart vertically across the full height of the panel. In this way, the prismatic inlet side may be edge-lighted to substantially reduce the overall thickness or depth of the display enclosure.

In the exemplary embodiment illustrated in FIGS. 1–4, the optical panel 12 may include a commercially available turning film sold under the TRAF II trademark available from the 3M company of St. Paul, Minn. This acronym stands for Transmissive Right Angle Film which includes prismatic grooves defined between triangular elongated prisms that may be used in an edge-lighted system for turning incident light obliquely therethrough up to about 90°. This film has a nominal thickness of about 155 microns, or about 6 mils, with prism apex angles of 71 degrees. A typical prism pitch of 50 microns produces a substantial number or multitude of prisms per unit length, such as about two hundred per centimeter. As an alternative to the light turning film, elongated prisms may instead be embedded or embossed within the surface of the inlet side 20 of the panel 12, thereby created prisms which are integral with the panel 12.

The panel inlet side 20 receives the image light inside each prism wherein it is internally reflected with total internal reflection. Since the index of refraction of ambient air outside the prismatic inlet side 20 is 1.0 and less than the refractive index of the prisms themselves, total internal reflection of the image light is obtained with correspondingly high light transmission efficiency. The image beam thusly enters the optical panel through the prism inlet first facets at the acute incidence angle A, and is internally reflected off the back sides of the second facets and redirected through the body film substantially perpendicularly outwardly from the screen 22 toward the observer.

The ability of the prisms to bend or turn the incident image beam 18 permits the optical panel to be manufactured extremely thin, and permits a significant reduction of the cabinet depth D. As shown in FIGS. 2 and 4, the image beams 18 from the two projectors 16 may be projected over the back, inlet side 20 of the panel in two different directions. The optical panel may be extremely thin by minimizing the angle of incidence of the image beam 18 over the inlet face and using the prisms for bending or turning the image beam for projection substantially perpendicularly outwardly from the screen.

In FIG. 4, the two image beams 18 are shown as projecting at corresponding angles of incidence A relative to the vertical axis of the optical panel or the plane of the inlet face. The incidence angle A has an acute value in the preferred range of about 0°–20°. The smaller the incidence angle, however, the thinner the overall depth D of the enclosure will be. The thickness of the optical panel itself may be as little as about 6 mils for suitable light redirecting capability, but may be suitably thicker for increasing its structural rigidity if desired. The optical panel may be self supporting in the cabinet, if desired, or may be otherwise rigidly mounted around its perimeter, or on opposite sides.

Although the prismatic optical panel 12 illustrated in FIG. 4 may receive the image light with an incidence angle up to about 20°, optimum light transmission efficiency occurs in a narrow range of about 8°–11°, with 9° being preferred. Since the required incidence angle is repeated over the entire vertical height H of the optical panel, sufficient depth behind the panel is required for projecting the image light over the entire inlet side 20. That depth behind the panel may be substantially reduced in accordance with the present invention as illustrated in the exemplary embodiment of FIGS. 1–4.

As initially shown in FIGS. 2 and 4, the overall depth or thickness D of the enclosure may be substantially reduced by initially splitting the video image into a plurality of image components such as the two top and bottom image half components 18b,c separately generated in the two projectors. The two image components are then projected via different paths through two corresponding top and bottom portions 12b,c of the panel at preferably the same acute incidence angles A relative to the inlet side 20 thereof for being turned therethrough to collectively form the complete image 18a on the outlet screen 22.

In the exemplary embodiment illustrated in FIG. 4, the top image component 18b is projected downwardly over the top half of the panel, and the bottom image component 18c is projected upwardly over the bottom half of the panel. Although the corresponding incidence angles A are preferably the same in magnitude, optimally at about 9°, they are oriented oppositely to each other within the same or common projection depth B as measured perpendicularly outwardly from the inlet side 20 of the panel.

In this way, the same projection depth B may be used for the two halves of the projected image light to illuminate the full height of the optical panel for substantially reducing the overall thickness or depth of the display enclosure. In contrast, if the image light were projected against the entire panel inlet side from a common source with the same incidence angle and direction either from the top or bottom, the corresponding projection depth B would be about twice as large.

This preferred method of displaying the entire video image 18 on the common or unitary optical panel may be effected in the one embodiment illustrated in FIGS. 2 and 4 by using a pair of substantially identical projectors 16 operatively joined to a common electrical video driver 24 which may take any conventional form. The video driver 24 is suitably modified to initially split the entire video image into multiple components, such as the two components required for separately driving the two projectors 16.

In this way, the top half of the video image 18b is generated in the top projector which illuminates the panel top half 12b therewith. And, the bottom projector 16 is driven to produce the bottom half image 18c which illuminates the panel bottom half 12c. The two image portions 18b,c adjoin each other near the vertical center of the panel and collectively produce the entire desired image 18a in two corresponding halves.

The video driver 24 therefore effects suitable means for initially splitting the desired video image 18a into a plurality of image components, such as two in the preferred embodiment. The video driver cooperates with the two projectors 16 for then projecting the image components onto corresponding portions of the optical panel for collectively producing the resulting image. The video driver 24 produces electrical signals indicative of the desired image which are converted in the two projectors 16 to spatially and temporally modulate light which defines the corresponding portions of the desired video image being projected against the optical panel.

The two projectors 16 illustrated in FIG. 4 may be located behind the panel in any convenient position for separately illuminating the two halves thereof. In the preferred embodiment illustrated, the two projectors are located directly behind the panel and are optically aligned with the corresponding top and bottom portions 12b,c of the panel for projecting the two image components 18b,c thereagainst with substantially equal incidence angles A, and within the same projection depth B measured from the inlet side of the panel, although other configurations may be contemplated which may result in unequal incidence angles and/or projection depths.

In order to obtain a compact consolidation of the light projecting components illustrated in FIG. 4, suitable elements in the exemplary form of a pair of top and bottom mirrors 26,28 are provided for folding at least one of the image components 18b,c behind the panel within the common projection depth B. In this way, at least one, and preferably both paths of the image components 18b,c may be folded between the corresponding projectors and the panel inlet side 20 for packaging the operative components within the same projection depth B for minimizing the overall depth D of the cabinet.

In the exemplary embodiment illustrated in FIGS. 2 and 4, the two projectors 16 are mounted behind the panel for projecting the image components in vertically opposite directions initially outwardly to the folding mirrors 26,28 and then vertically inwardly toward the corresponding panel portions 12b,c at the same, but at opposite inclination angles A. The video image 18a is initially split behind the panel using the two projectors disposed inside the outboard edges of the panel. And, then the two image components 18b,c are correspondingly folded near or at the top and bottom outboard edges of the panel for projection through the corresponding panel portion.

In this way, the two image components are projected inboard toward the panel portions from the opposite top and bottom outboard edges of the panel for illuminating the full half-heights of the corresponding panel portions from the outboard edges to the common horizontal junction thereof at the center of the panel.

In this embodiment, the pair of folding mirrors 26,28 are disposed behind the panel at the corresponding opposite top and bottom ends thereof, and are optically aligned with corresponding ones of the projectors 16 which are disposed frontwardly therefrom behind the center of the panel.

As shown in FIG. 2, the individual projectors 16 include suitable optics for horizontally and vertically scaling and focusing the image components for reflection from the corresponding mirrors 26,28 to produce the desired video image over the entire full scale of the panel screen both horizontally and vertically. The two folding mirrors 26,28 preferably have suitable compound curvatures for receiving the respective portions of the image light from the projectors and distributing that light over the full width of the panel and over the respective half-height extent of the two panel portions 12b,c.

The incidence angles A illustrated in FIG. 4 may thusly be in a preferred range of about 8°–11°, and are optimally 9° each, but in opposite directions. In this way, half of the desired video image is projected over the top half of the common panel, with the bottom half of the video image being projected over the bottom half of the panel. The same incidence angle A may be used for illuminating the corresponding portions of the panel inlet side 20 for optimal projection efficiency. And, the resulting projection depth B is considerably less than it would otherwise be if the image light were otherwise projected over the full height of the panel from the same direction and from a common source (not shown).

An additional advantage of using the two projectors 16 separately configured for projecting the corresponding portions of the final video image is that the projectors and their components may be correspondingly reduced in size, with a corresponding ease of manufacturability and a corresponding reduction in cost therefor. The projectors may thus be sufficiently small in size for also fitting within the limited projection depth B required for illuminating the two halves of the panel.

Figure 5:
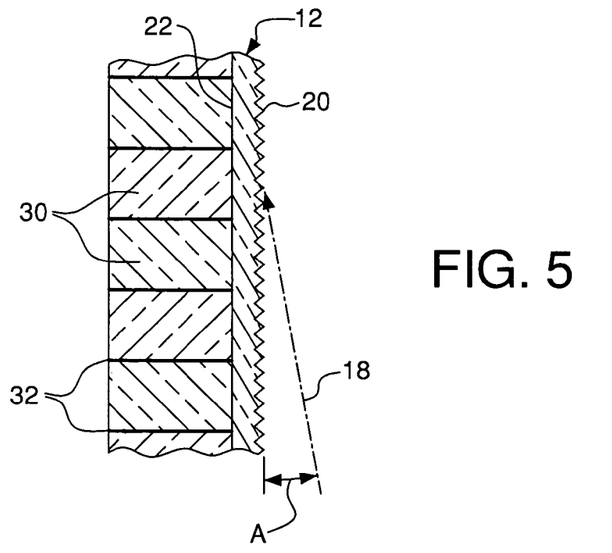
FIG. 5 is an enlarged sectional side view of the optical panel illustrated in FIG. 1 in accordance with another embodiment thereof.

Illustrated in FIG. 5 is a portion of the optical display of FIG. 1 in accordance with another embodiment of the present invention. In addition to the prismatic panel 12 itself, the panel may also include a plurality of vertically stacked together optical waveguides 30 defining an inlet face at back ends thereof adjoining the prismatic panel's second side 22 for receiving image light. The opposite ends of the waveguides define the outlet or display screen preferably disposed substantially parallel with the inlet face.

Each waveguide 30 includes a central transparent core having a first index of refraction, and may be formed of an optical plastic or glass. The cores are laminated between cladding layers 32 having a second index of refraction lower than that of the cores for providing substantially total internal reflection of the image light as it is transmitted through the cores. The cladding may be a suitable plastic or epoxy for example.

In this embodiment, the prismatic panel 12 effects a light coupler adjoining the entire inlet face of the waveguides, and may be suitably bonded thereto for coupling or redirecting the image light into the inlet face for transmission through the waveguides for substantially total internal reflection. The waveguides have a limited acceptance angle for receiving incident light, and the coupler panel ensures that the image light is suitably turned in direction for entering the waveguide cores within their acceptance angles.

The waveguides 30 are in the preferred form of flat ribbons extending continuously in the horizontal direction along the entire panel width W. The ribbon waveguides are preferably stacked vertically on top of each other along the full panel height H, and may number between about 525–3000 waveguides for providing 525–3000 vertical lines of resolution, or more or less as desired.

In the preferred embodiment illustrated in FIG. 5, the waveguides 30 are perpendicular to prismatic panel's second side 22, with the cores extending solely horizontally without inclination. A significant advantage of this orientation is that the image light is transmitted horizontally through the waveguides for direct viewing by an observer or viewer. The viewer, therefore, receives the full intensity of the image light for maximum brightness. The individual waveguides ensure that the image light is transmitted therethrough without substantial loss, and the horizontal and vertical pixels maintain maximum resolution and brightness.

Another advantage of the waveguides is that they inherently have the capability for rejecting ambient light external to the screen which is incident thereon obliquely thereto. This increases the apparent blackness and contrast of the screen.

In order to provide additional blackness in the screen, the cladding 32 is preferably a dark color (e.g. black) for absorbing the ambient light impinging on the screen. The exposed edges of the cladding at the screen are directly viewable as being black to the observer. And, any ambient light which enters the waveguides off-axis through the screen will be absorbed internally by the black cladding. The black cladding may be formed in any suitable manner such as with black spray paint, or carbon particles within an epoxy adhesive joining together the adjacent cores in one or more cladding layers as desired.

Figure 6:
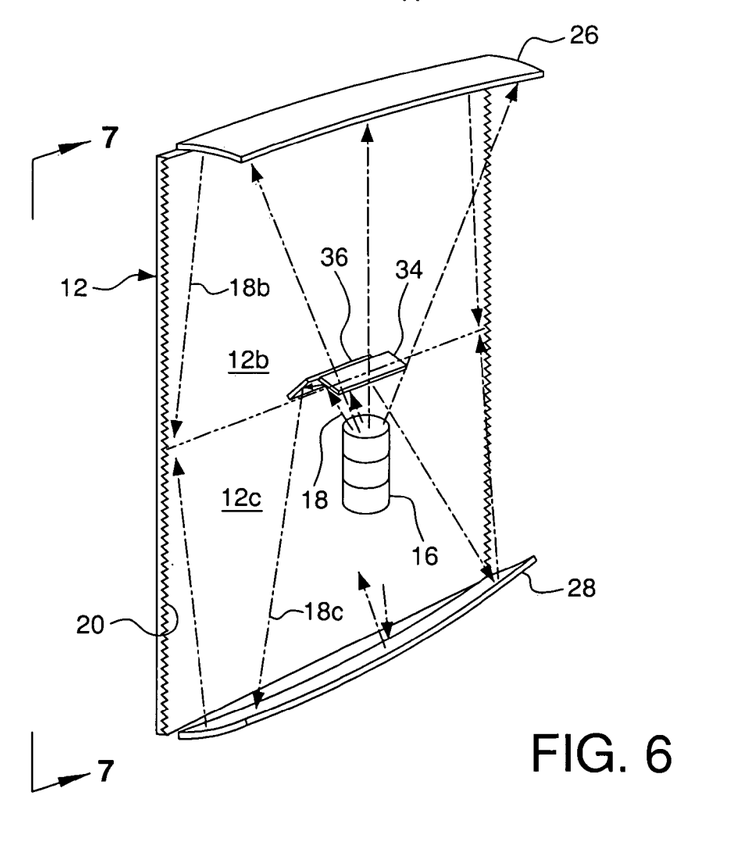
FIG. 6 is a back isometric view of a video display in accordance with another embodiment of the present invention.
Figure 7:
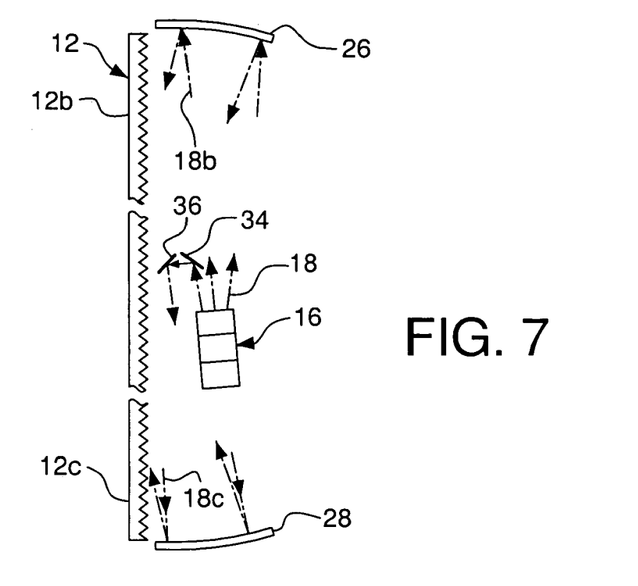
FIG. 7 is a side view of the video display illustrated in FIG. 6 and taken along line 7—7 in FIG. 6.

Illustrated in FIGS. 6 and 7 is yet another embodiment of the present invention in which the desired video image is optically split from a single projector 16 disposed behind the panel 12 on its prismatic inlet side 20. In this embodiment, the video driver drives the projector 16 for producing the entire video image as the image light is emitted therefrom.

The image is optically split by using a splitting mirror 34 optically aligned with a portion of the projector and the bottom folding mirror 28, for example. The splitting mirror 34 is sized, configured, and positioned to intercept half of the image light being emitted from the projector 16 which is then turned by a cooperating intermediate folding mirror 36 for being redirected across the bottom folding mirror 28. The remaining half of the image light from the projector which is not intercepted by the splitting mirror is received by the top folding mirror 26 and redirected across the panel top portion 12b. In this way, the two panel portions 12b,c are illuminated with corresponding halves of the video image 18b,c initially produced from the common projector 16 and then optically separated by the splitting mirror 34.

As indicated above, the projector 16 includes suitable optics therein sized and configured for scaling and focusing the image light both horizontally and vertically as required to produce a properly scaled and focused final video image over the optical panel. In the single projector embodiment illustrated in FIG. 6, the splitting mirror 34 is preferably located at an intermediate focal plane of the video image light being emitted from the projector for ensuring a properly focused video image at the panel screen. The two image components 12b,c are projected through the corresponding panel portions 12b,c at a second focal plane thereat for effecting a properly focused video image including both its top and bottom portions.

The splitting mirror 34 preferably cooperates with the additional folding mirror 36 optically aligned therewith for additionally folding the bottom component 18c of the video image after splitting at the splitting mirror 34, and before final folding at the bottom mirror 28 along the outboard edge of the panel. The top image 18b is thusly folded once from the projector at the top mirror 26, whereas the bottom image 18c is folded twice from the common projector.

The various folding and splitting mirrors illustrated in FIGS. 6 and 7 are indicative of various packaging configurations which may be used for separately illuminating the different portions of the panel with common angles of incidence within the narrow projection depth associated therewith for reducing the overall thickness of the optical display enclosure.

Figure 8:
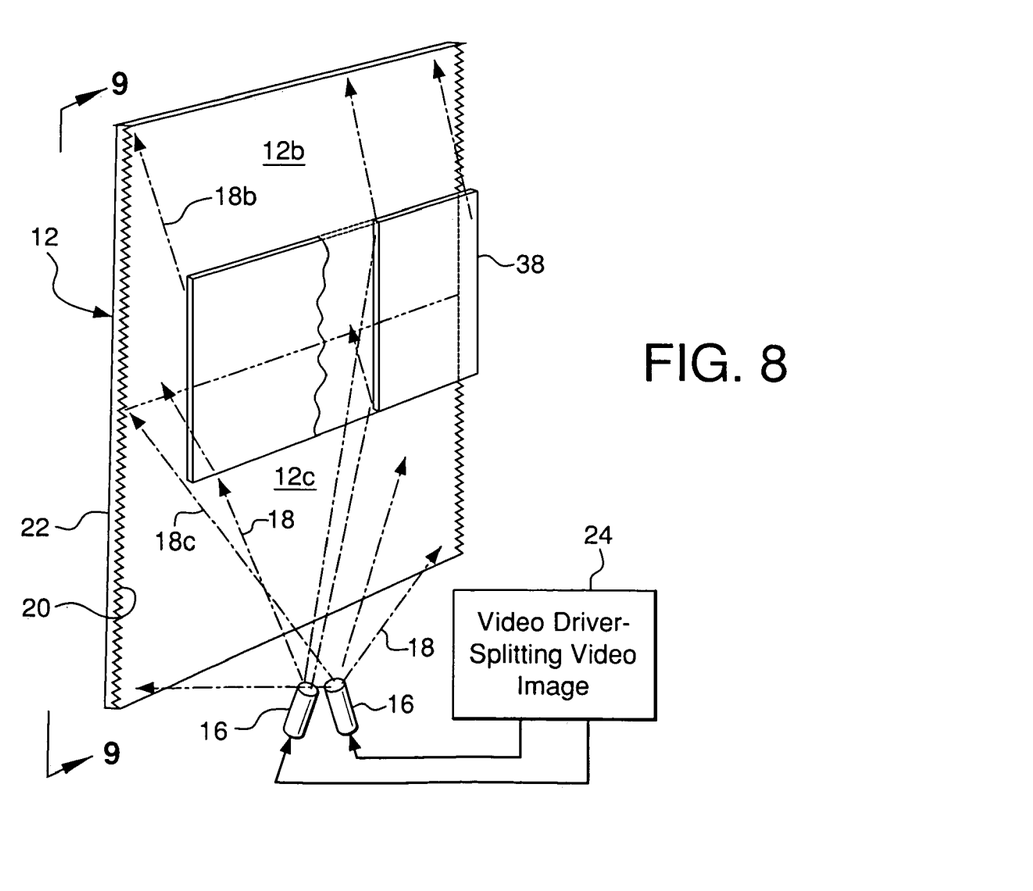
FIG. 8 is a back isometric view of a video display in accordance with another embodiment of the present invention.
Figure 9:
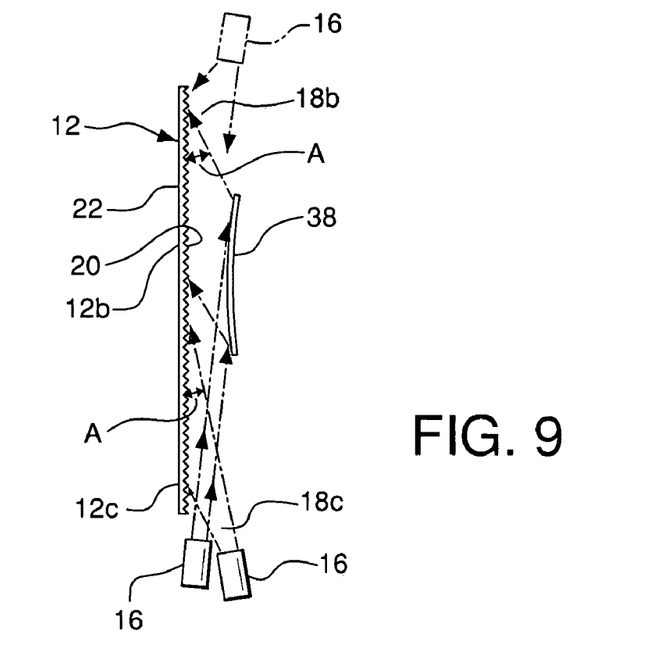
FIG. 9 is a side view of the video display illustrated in FIG. 8 and taken along 9—9 in FIG. 8.

In the exemplary embodiments illustrated in FIGS. 1–7, the multiple image components are directed oppositely to each other inwardly from both outboard edges of the common panel. Illustrated in FIGS. 8 and 9 is another embodiment of the invention wherein the multiple image components 18b,c are directed in generally the same direction against the inlet side of the panel, and from a common edge thereof for example.

In this embodiment, the desired video image is again originally split in the video driver 24 for separately driving the two projectors 16 each of which projects the corresponding portion of the collective video image. The two projectors may be located below the bottom edge of the panel inside a suitable portion of the cabinet for projecting the image components over the panel inlet side from outside the common outboard bottom edge thereof.

In this embodiment, a single folding mirror 38 is disposed behind the panel 12 and inboard of its outboard edges in optical alignment with a corresponding one of the two projectors 16 and a corresponding portion of the panel. As best shown in FIG. 9, one of the projectors 16 is optically aligned with the folding mirror 38 for reflecting the image light therefrom to engage the panel top portion 12b at the desired small incidence angle A. In this way, the image light from the projector 16 is folded directly behind the panel solely within the surrounding outboard edges thereof.

The remaining projector 16 is directly optically aligned with the remaining bottom panel portion 12c for illuminating the inlet side thereof with the bottom image 18c at the desired acute incidence angle A.

The folding mirror 38 illustrated in FIG. 8 extends substantially the full width of the panel for spreading the top image component 18b across the full width of the panel and over the full height of the top panel portion 12b, which is half the height of the entire panel itself. And, the panel bottom portion 12c is directly illuminated by the remaining projector, with the respective incidence angles A for the top and bottom image components being substantially the same and in generally the same direction. The folding mirror 38 is positioned within the small projection depth from the panel in which the top image component 18b is distributed over the corresponding height of the top panel portion 12b.

FIG. 9 illustrates an embodiment using a single folding mirror 38 limited to one of the two projectors 16. In this configuration, both projectors and beam splitters may be supported within a space in the display cabinet beneath the display. And in an alternate embodiment illustrated in phantom in FIG. 9, the single folding mirror 38 may be eliminated and the projector 16 associated therewith may instead be located at the top of the panel for directly illuminating the panel top portion in the same manner as the bottom projector illuminating the panel bottom portion at equal but opposite incidence angles. The display cabinet may suitably extend above and below the panel for supporting therein the corresponding projectors for directing the corresponding portions of the image separately over the top and bottom portions of the panel within the correspondingly small projection depth therefrom.

Figure 10:
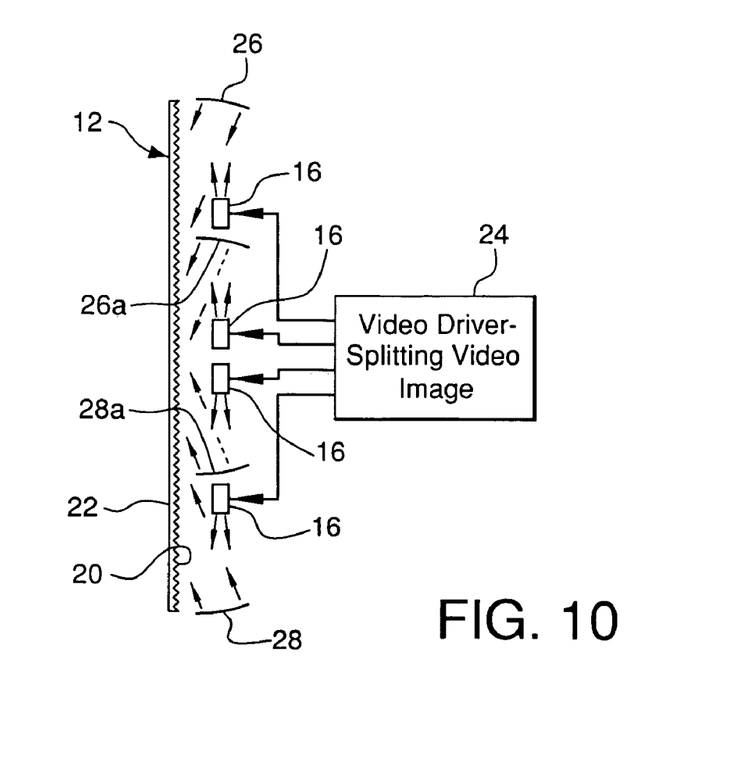
FIG. 10 is a side, schematic view of a video display in accordance with another embodiment of the present invention.

As indicated above, the basic method of the present invention splits the desired video image to be projected on the unitary optical panel 12 into multiple image components which are separately projected against corresponding portions of the panel inlet side for reducing the required projection depth for illuminating the corresponding height portions of each of the panel portions. For each split of the projected video image over the height of the panel inlet side, a corresponding reduction in projection depth is realized. FIG. 10 illustrates yet another embodiment of the present invention which is derived from the embodiment illustrated in FIGS. 1–4.

In FIG. 10, the video image is initially split in the video driver 24 into four image components for correspondingly driving four video projectors 16. The top and bottom projectors 16 are optically aligned with the corresponding top and bottom folding mirrors 26,28 in the manner described above for illuminating the top and bottom quarter portions of the optical panel. The two middle projectors 16 are optically aligned with corresponding intermediate folding mirrors 26a,28a for illuminating the two inboard quarter portions of the optical panel.

In this way each quarter-height of the optical panel 12 is separately illuminated by a corresponding projector 16, all with generally the same acute incidence angles. The top two image portions project downwardly in the same direction, whereas the bottom two image portions are projected upwardly with the same direction to each other but oppositely to the top two image portions.

The four folding mirrors extend substantially the full width of the optical panel but have correspondingly shorter widths measured perpendicularly outwardly from the inlet side of the panel. The cooperating projectors may be correspondingly reduced in size and are configured to fit within the available projection depth of the four folding mirrors. The video driver 24 may have a suitable electronic configuration of relatively small size that may be conveniently located directly behind the panel or outside the four outboard edges thereof. The resulting display panel, including its projecting components, may therefore be configured in a relatively thin depth.

Accordingly, not only is the optical panel 12 itself extremely thin in thickness, but the projecting elements may be correspondingly reduced in projection depth for reducing the overall thickness or depth of the optical display enclosure.

The invention has particular benefit for the transmissive right angle films used in the optical panel 12 in redirecting the incident image light from the shallow angle of incidence for projection substantially perpendicularly outwardly from the screen side thereof. The angle of incidence may be limited to its optimal value of about 9° for efficiently turning the image light through the panel, and by splitting the image light into corresponding portions. The maximum projection depth for the incident image light is substantially reduced thus reducing the overall thickness of the projecting and displaying enclosure.

Various forms of the video projector 16 and folding mirrors may be used to advantage for effecting a compact assembly of components having limited projection depth. The video image may be initially electronically split in the video driver which feeds corresponding projectors, or may be split optically from a common projector.

Although the projectors and optical elements are configured for spreading the video image across the full width of the optical panel as well as collectively across the full height of the optical panel, other embodiments may be used for distributing the video image and corresponding portions thereof over both the height and width of the panel as desired.

For each of the embodiments above, it may be envisioned that optical panel 12 may comprise waveguides which are each surrounded by cladding (as described with reference to FIG. 5) and an optional light turning film placed on the panel input surface. Or, when no waveguides/cladding are used, the panel 12 may alternatively simply consist of light turning (or directing) film. It should be understood that, in any of the above embodiments, the optical panel 12 may optionally include a diffuser. The diffuser may be employed in the form as described above with reference to FIG. 3.

Figure 11:
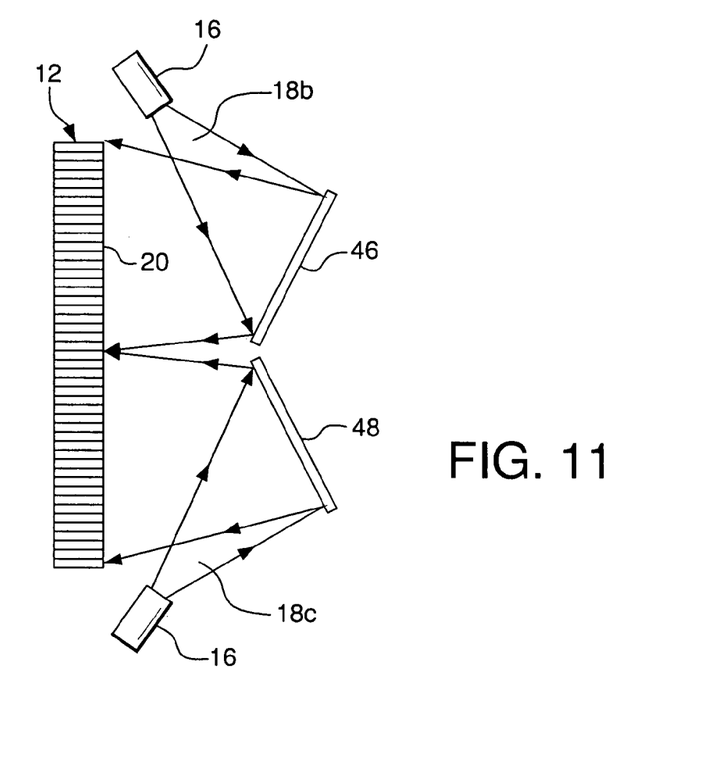
FIG. 11 is an enlarged side view of a video display in accordance with another embodiment of the present invention.
Figure 12:
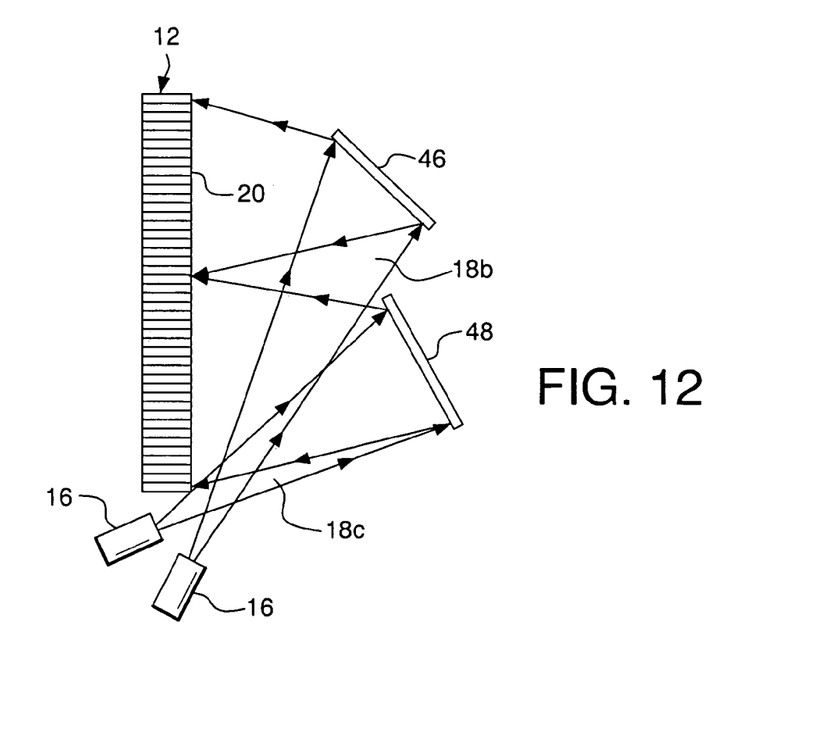
FIG. 12 is an enlarged side view of a video display in accordance with another embodiment of the present invention.

FIG. 11 illustrates an exemplary embodiment wherein the optical panel 12 comprises waveguides. In this particular configuration, a prismatic portion on the inlet face 20 of the panel 12 is not included within the panel 12. The projectors 16 may be located at positions similar to that described in the above embodiments. However, in order to compensate for the omission of a prismatic portion or light turning film on the inlet face 20 of the panel 12, the image light must ultimately be projected toward the inlet face 20 at a substantially less acute angle (i.e. than the embodiments which include the prismatic inlet face 20) to account for the limited light acceptance as defined by the waveguide's light entrance cone angle. To accomplish this, the projectors direct the image components 18b,c rearwardly toward mirrors 46,48 which reflect the image components 18b,c separately frontwardly toward the top and bottom portions 12b,c, respectively, of the panel 12. The panel illustrated in FIG. 11 utilizes projectors 16 which are located at the top and bottom of the panel 12 as similarly positioned in the FIG. 9 embodiment (i.e. shown in phantom). FIG. 12 illustrates an alternative exemplary embodiment wherein projectors 16 are both located at the bottom of the panel 12 as similarly positioned in the FIG. 9 embodiment.

While there have been described herein what are considered to be preferred and exemplary embodiments of the present invention, other modifications of the invention shall be apparent to those skilled in the art from the teachings herein, and it is therefore desired to be secured in the appended claims all such modifications as fall within the true spirit and scope of the invention. For example, although a 50 inch display is described in the above embodiments, displays of various other sizes may of course be contemplated using the teachings discussed above. Also, although the embodiments above described the splitting of the image into 2 or 4 image components, the image may be split into any number (i.e. 2 or more) of image components as desired. Moreover, these components may be positioned vertically (as described in the embodiments above) or horizontally with respect to each other, or in other configurations as desired.

Although the above embodiments describe the image components traveling generally in an overall vertical direction (i.e. with the projectors positioned below and above the display screen, the display system can be employed in other configurations. For example, the image components can instead be directed from projectors positioned on the right and left sides of the display. Of course, in this particular configuration, a corresponding change in orientation of the display (e.g. waveguides) and/or light turning film may be required. As another alternative, the image components may be employed (i.e. projected onto the panel 12) in an array-type matrix configuration if desired.

The mirror(s) in each of the above embodiments may take any form as required. For example, the mirror(s) may comprise a surface which is planar, concave, convex, spherical, cylindrical, toric, conic, elliptical, or combinations thereof. The surface of the mirror(s) may be provided in whole, or in part, by Fresnel steps or facets. It may also be envisioned that the mirror(s) contain a particular prescription (i.e. curvature) which may correct image distortion which may be present in the projected image(s).

The invention claimed is:

1. A method of displaying an image from an optical panel comprising the steps of:
   splitting said image into a plurality of image components, wherein said splitting of said image occurs behind said panel and inside of outboard edges thereof; and
   projecting said image components through corresponding portions of said panel to collectively form said image, wherein at least one of said image components is folded near at least one of said outboard edges for projection through said corresponding panel portions;
   wherein the step of splitting comprises splitting said image from a single projector disposed behind said panel;
   wherein the step of projecting includes projecting said image components toward said panel portions at acute incidence angles thereto whereby said image components are redirected at an inlet face of said panel in a direction substantially perpendicular to the inlet face of said panel, and wherein said incidence angles are within a range of about 8°–11°; and
   wherein the image is a video image.

2. A method according to claim 1 wherein said incidence angles are substantially equal but opposite in sign to each other.

3. A method according to claim 1 wherein the step of projecting comprises initially projecting said image components in substantially the same direction.

4. A method according to claim 1 wherein the step of projecting comprises projecting said image components frontwardly toward said panel portions from opposite edges of the panel.

5. A method according to claim 1 wherein the step of projecting comprises projecting at least one of said image components toward said panel through a folded optical path.

6. A method according to claim 5 wherein each folded optical path is effected by a folding mirror, and wherein the folding mirror comprises a surface selected from the group consisting of planar, concave, convex, spherical, cylindrical, toric, conic, elliptical, Fresnel, and combinations thereof.

7. A method according to claim 1 wherein the step of folding comprises utilizing at least one folding mirror, and wherein each folding mirror comprises a surface selected from the group consisting of planar, concave, convex, spherical, cylindrical, toric, conic, elliptical, Fresnel, and combinations thereof.

8. A method according to claim 1 wherein the splitting of said image from the single projector is performed by a splitting mirror which is configured to reflect a portion of said image thereby separating said plurality of image components from said image.

9. A method according to claim 1 wherein the step of splitting comprises splitting said image from the single projector at an intermediate focal plane thereof, and wherein the step of projecting said image components through said panel portions is performed at another focal plane thereat.

10. A method according to claim 1 further comprising the step of additionally folding one of said image components with an auxiliary folding mirror after said splitting of said image and before said folding of said at least one of said image components.

11. A method according to claim 1 wherein said step of folding is performed by a pair of outboard folding mirrors which are located at opposite outboard edges of said panel.

12. A method according to claim 1 wherein the panel comprises a prismatic inlet face.

13. A method according to claim 12 wherein the prismatic inlet face comprises a light turning film.

14. A method according to claim 12 wherein the prismatic inlet face comprises prisms which are embedded within a surface of a body of the panel.

15. A method according to claim 1 wherein the panel comprises waveguides, wherein each waveguide comprises a core surrounded by cladding, and wherein the cladding has a refractive index lower than that of the core.

16. An optical display system comprising:
   an optical panel;
   a splitting element that splits an image into a plurality of image components, wherein said image is split into the plurality of image components behind said panel and inside of outboard edges thereof; and
   an optical system that projects said image components through corresponding portions of said panel to collectively form said image, wherein the optical system comprises at least one folding mirror that folds at least one of said image components near at least one of said outboard edges for projection through said corresponding panel portions;
   wherein said plurality of image components originate from a single projector disposed behind said panel, wherein the optical system includes the single projector which projects said image components toward said panel portions at acute incidence angles thereto whereby said image components are redirected at an inlet face of said panel in a direction substantially perpendicular to the inlet face of said panel, and wherein said incidence angles are within a range of about 8°–11°; and wherein the image is a video image.

17. A display system according to claim 16 wherein said incidence angles are substantially equal but opposite in sign to each other.

18. A display system according to claim 16 wherein the optical system comprises at least one folded optical path, and wherein the single projector projects at least one of said image components toward said panel through said at least one folded optical path.

19. A display system according to claim 17 wherein each folded optical path includes a folding mirror, and wherein the folding mirror comprises a surface selected from the group consisting of planar, concave, convex, spherical, cylindrical, tonic, conic, elliptical, Fresnel, and combinations thereof.

20. A display system according to claim 16 wherein each folding mirror comprises a surface selected from the group consisting of planar, concave, convex, spherical, cylindrical, tone, conic, elliptical, Fresnel, and combinations thereof.

21. A display system according to claim 16 wherein the splitting element comprises a splitting mirror which is configured to reflect a portion of said image generated by said single projector thereby separating said plurality of image components from said image.

22. A display system according to claim 16 wherein said plurality of image components originate from the single projector, and wherein the image is split into the plurality of image components at an intermediate focal plane of the single projector, and wherein the image components are projected through said panel portions at another focal plane of the single projector.

23. A display system according to claim 16 wherein the optical system further comprises an auxiliary folding mirror positioned optically between the splitting element and the at least one folding mirror such that said auxiliary folding minor additionally folds said at least one of said image components after said image is split into the plurality of image components and before said at least one of said image components is folded.

24. A display system according to claim 16 wherein said at least one folding mirror comprises a pair of outboard folding mirrors which are located at opposite outboard edges of said panel.

25. A display system according to claim 16 wherein the panel comprises a prismatic inlet face.

26. A display system according to claim 25 wherein the prismatic inlet face comprises a light turning film.

27. A display system according to claim 25 wherein the prismatic inlet face comprises prisms which are embedded within a surface of a body of the panel.

28. A display system according to claim 16 wherein the panel comprises waveguides, wherein each waveguide comprises a core surrounded by cladding, and wherein the cladding has a refractive index lower than that of the core.

* * * * *